United States Patent
Herrenbruck

(10) Patent No.: US 6,557,496 B2
(45) Date of Patent: May 6, 2003

(54) TREAT DISPENSING TOY

(75) Inventor: Rodney K. Herrenbruck, Chesterfield, MO (US)

(73) Assignee: Marketing and Creative Sales, Inc., Chesterfield, MO (US)

( * ) Notice: Subject to any disclaimer, the term of this patent is extended or adjusted under 35 U.S.C. 154(b) by 0 days.

(21) Appl. No.: 10/061,616

(22) Filed: Feb. 1, 2002

(65) Prior Publication Data

US 2002/0115377 A1 Aug. 22, 2002

Related U.S. Application Data

(63) Continuation-in-part of application No. 09/776,451, filed on Feb. 2, 2001, now Pat. No. 6,484,671.

(51) Int. Cl.[7] .............................................. A01K 29/00

(52) U.S. Cl. ...................................... 119/707; 119/710

(58) Field of Search ............................... 119/707, 709, 119/702, 710, 711; D30/160; 446/409, 397; 273/153 R

(56) References Cited

U.S. PATENT DOCUMENTS

| | | |
|---|---|---|
| 666,022 A | 1/1901 | Norris et al. |
| 2,529,661 A | * 11/1950 | Millstein ............... 296/203.01 |
| 2,590,476 A | * 3/1952 | Stough ....................... 215/228 |
| 3,648,403 A | 3/1972 | Gommel |
| 4,595,369 A | 6/1986 | Downs |
| 5,343,828 A | 9/1994 | Houghton et al. |
| 5,375,839 A | 12/1994 | Pagani |
| 5,387,108 A | 2/1995 | Crowell |
| 5,575,240 A | 11/1996 | Udelle et al. |
| 5,634,436 A | 6/1997 | Coombs et al. |
| 5,758,604 A | 6/1998 | Jørgensen |
| 5,794,568 A | 8/1998 | Udelle et al. |
| 5,813,366 A | 9/1998 | Maudlin, Jr. |
| 5,819,690 A | 10/1998 | Brown |
| 5,832,877 A | 11/1998 | Markham |
| 5,865,147 A | 2/1999 | Rubin |
| 5,947,061 A | 9/1999 | Markham et al. |
| 5,957,082 A | 9/1999 | Budman et al. |
| 5,965,182 A | 10/1999 | Lindgren |
| 6,039,213 A | * 3/2000 | Sloan et al. ................ 222/192 |

(List continued on next page.)

OTHER PUBLICATIONS

R.C. Steele Online Pet Supplies, Internet online pet supply advertisement for "Wiggly Giggly" pet toy, available on–line at www.rcsteele.com/ on Nov. 18, 2000.
Product tag—Play–N–Speak™ Toy; Copyright Notice 2000.
Information Storage Devices, Inc., Data Sheet—ISD 1510, Single–Chip, Single–Message Voice Record/Playback Device 8–to 16–Second Durations, 20 pages, Copyright 1997.
Advertisement for Wiggly Giggly Plush® infant toys, www.handsonontoys.com/infant/wg_plush.php copyright 2002 HandsOn Toys, Inc.
Declaration of Rodney K. Herrenbruck, dated Apr. 24, 2002.

*Primary Examiner*—Yvonne Abbott
(74) *Attorney, Agent, or Firm*—Senniger, Powers, Leavitt & Roedel

(57) ABSTRACT

A treat dispensing toy having a noise producing unit. In one embodiment, the noise producing unit includes a recording and playback capability. The toy has an exit allowing treats to be dispensed when the toy is manipulated by a user. The toy selectively produces a noise when it is manipulated by the user. A ring closure member is secured to the exit and restricts the size of the exit. One or more barriers are disposed about the interior of the toy such that egress of the treats is retarded by the one or more barriers. A cover for the toy can be used to reconfigure and/or refurbish the appearance of the toy. In one form, the cover is affixed to the toy housing by the ring closure. The toy housing can be any of a number of shapes, including, for example, a ball or a bone.

26 Claims, 18 Drawing Sheets

U.S. PATENT DOCUMENTS

| | | |
|---|---|---|
| 6,073,581 A | 6/2000 | Wang |
| 6,098,571 A | 8/2000 | Alexrod et al. |
| 6,139,393 A * | 10/2000 | Coleman et al. ............ 426/104 |
| 6,158,390 A | 12/2000 | Holtier et al. |
| 6,237,538 B1 | 5/2001 | Tsengas |
| 6,289,846 B1 * | 9/2001 | Long ....................... 119/51.03 |
| 6,325,693 B1 * | 12/2001 | Rudell et al. ............... 426/104 |
| 2001/0008125 A1 * | 7/2001 | Mann ........................ 119/709 |
| 2001/0027754 A1 | 10/2001 | Tsengas |

* cited by examiner

US 6,557,496 B2

TREAT DISPENSING TOY

CROSS REFERENCE TO RELATED APPLICATION

This application is a continuation-in-part of U.S. patent application Ser. No. 09/776,451, filed on Feb. 2, 2001 now U.S. Pat. No. 6,484,671, the entire disclosure of which is incorporated herein by reference.

FIELD OF THE INVENTION

The invention relates generally to a toy. In particular, the invention relates to a toy for a pet or child that can record and playback sounds, and that can dispense treats or other desirable objects when manipulated.

BACKGROUND OF THE INVENTION

There are a number of amusement devices and toys in the prior art for entertaining and stimulating their users, often pets or children. Some toys are designed to stimulate the user, be that user a pet or a child, by emitting sounds. For example, U.S. Pat. No. 5,375,839 discloses an impact sensitive talking ball that emits a message when the ball is hit or bounced. Other toys are designed to dispense desired objects, such as pet treats. U.S. Pat. No. 6,098,571 provides an example of such a device. The device disclosed in that patent provides an inner housing that is movable within an outer housing. As the device is motioned by a pet, the device delivers treats placed in the inner housing through openings associated with the outer housing.

These devices in the prior art, however, provide only limited stimulation. A device might provide an audio-based stimulation that is designed to engage a user's attention. Another device may attract a user's attention by delivering treats when the device is used. Such limited stimulation reduces the likelihood that a user, such as a pet, will be sufficiently interested in the toy to use it as intended.

Further, toys, including pet toys, can wear out or become damaged. Likewise, after a time a toy may lose its appeal to the user. In both cases, the user may no longer desire to play with toy.

For these reasons, an improved treat dispensing toy is desired. Such an improved treat dispensing toy benefits from providing multiple sensory stimuli. For example such a toy provides a visually attractive toy that is of an appropriate size and shape to engage the target user's attention. The toy also provides the capability to selectively deliver desired objects, such as treats, when the toy is manipulated by the user. Likewise, the toy provides audio stimulation to keep the target user's attention once engaged. Such stimulation is preferably user definable. It is also desirable to provide a toy that can be selectively reconfigured to account for wear and tear, or to change the appearance of the toy to the user.

SUMMARY OF THE INVENTION

The invention meets the above needs and overcomes the deficiencies of the prior art by providing an improved treat dispensing toy. This is accomplished by providing a toy that attracts the intended user's attention by providing multiple levels of stimulation. Such stimulation preferably includes audio stimulation and reward stimulation. By allowing recording of messages and sounds that can be selectively played back as the toy is used, the intended user's attention is engaged. Further, by allowing treats to be dispensed as the toy is manipulated, the user is rewarded for using the toy. Also provided is a cover for the toy. The cover can be used to selectively reconfigure and/or refurbish the appearance of the toy to the user.

Briefly described, in one aspect the invention relates to a toy suitable for dispensing treats when the toy is manipulated by a user. The toy includes a housing having an interior space and an exterior surface. The interior space defines a treat cavity for storing a treat to be dispensed from the toy. An exit from the housing is provided. The treat is dispensed through the exit when the toy is manipulated by the user. A sound unit is secured to the housing. The sound unit sounds a noise when the toy is manipulated by the user.

In another aspect, the invention relates to a cover for use in connection with a treat dispensing toy. Such a toy includes a housing and a sound unit secured to the housing. The housing has an interior space for storing a treat, an exterior surface, and a housing exit through which the treat may be dispensed. The cover includes a generally pliable material that is constructed and arranged for covering a substantial portion of the exterior surface of the housing. An access aperture is provided in the generally pliable material. The access aperture is sized and shaped for allowing the housing of the toy to be placed inside the generally pliable material. The access aperture has an aperture closure for selectively closing the access aperture.

In still another aspect, the invention relates to a toy for dispensing treats. The toy includes a generally hollow housing having an inner surface defining an interior. The housing has an exterior surface. The housing is generally bone-shaped and has a first end and a second end opposite the first end. An opening in the housing at the first end is constructed and arranged to facilitate loading a treat into the interior space of the housing. A treat regulator is positioned in the interior space of the housing. An exit in the housing at the second end is constructed and arranged to permit the treat to be dispensed from the housing. A sound unit selectively plays a sound. The sound unit is removably secured to the opening to substantially close the opening to prevent the treat from exiting the toy through the opening.

Alternatively, the invention may comprise various other devices and methods.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
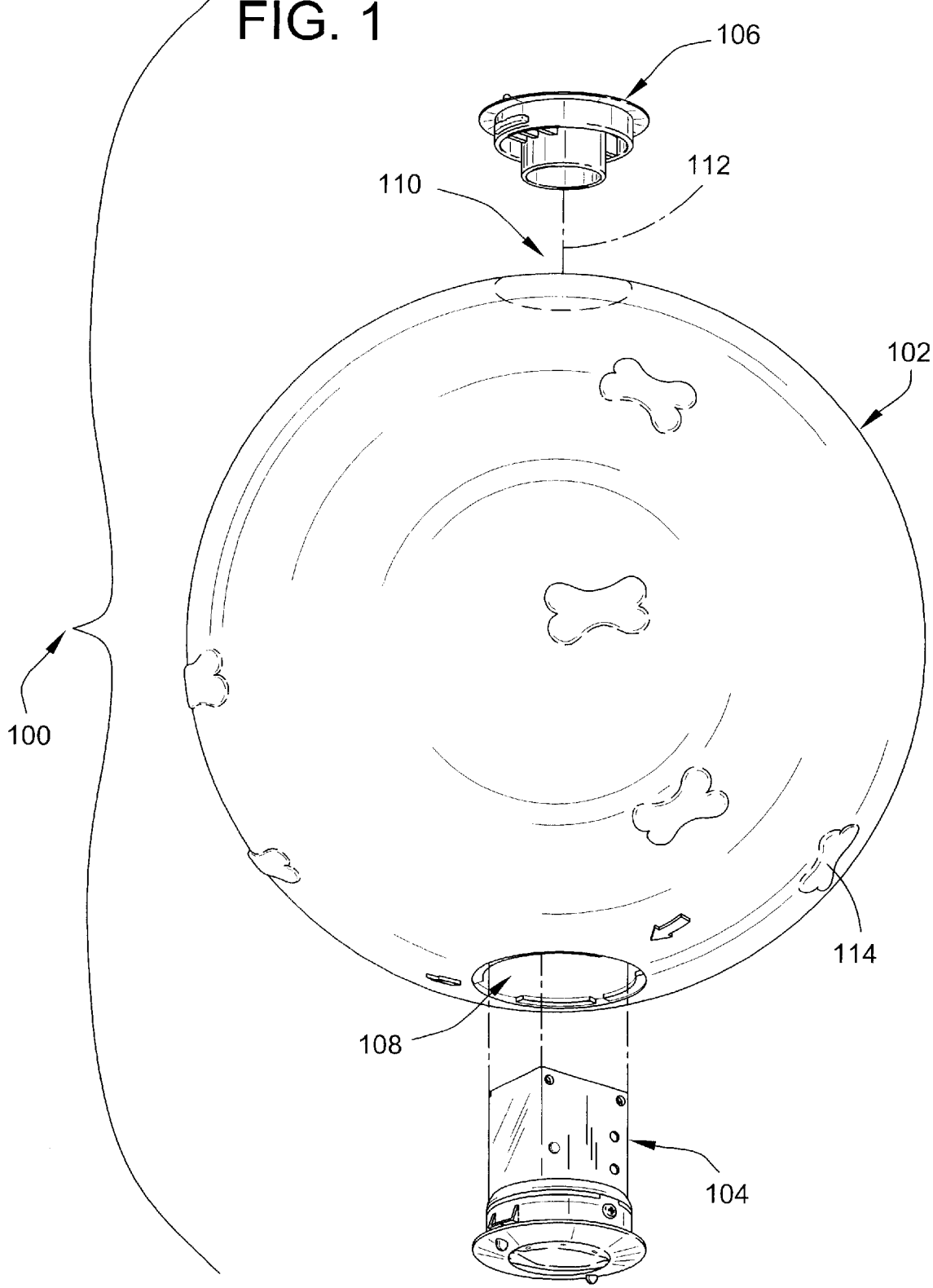
FIG. 1 is a separated side view of a treat dispensing toy having a sound recording and playback capability that is illustrative of aspects of the present invention.

Referring now to the drawings, FIG. 1 is a separated side view of a talking treat dispensing toy, according to aspects of the present invention, that is suitable for use in dispensing desired objects, such as pet treats, when manipulated by a user, such as a pet. As shown in FIG. 1, the toy preferably (although not necessarily) comprises a ball 100 having a generally spherical shape. The ball 100 is preferably made out of a hard substance such as plastic that can be manufactured using readily available fabrication processes.

As can be appreciated from FIG. 1, ball 100 includes a housing 102 (also referred to as a shell), a sound unit 104, and a ring closure member 106. Preferably, the sound unit 104 is removably secured to an opening 108. Similarly, the ring closure member 106 is removably secured to an exit 110. In the embodiment illustrated in FIG. 1, the opening 108 and the exit 110 are positioned substantially about a central axis 112 of the housing 102. As shown in FIG. 1, both sound unit 104 and ring closure 106 are secured to opening 108 and exit 110 respectively by bayonet fasteners or similar means. Additional aspects of sound unit 104 and ring closure 106 are discussed in greater detail below.

A plurality of raised features or embossments, such as bone shaped symbols 114, are preferably positioned on the exterior of housing 102. Other symbols and shapes such as, for example, hearts may be suitable for use in different embodiments. Aside from providing an aesthetic quality, these raised symbols 114 facilitate gripping of ball 100 by a user and may be referred to as grip members. For example, a dog can grip ball 100 in its mouth by way of raised symbols 114. The raised symbols 114 are preferably formed integrally with housing 102. Further, an optional cover (see FIGS. 17A and 17B) can be added to cover the exterior of housing 102. For example, neoprene or another suitable material may be used to cover ball 100 so that the toy is softer than the material used to construct ball 100 originally. In one form, the cover is securely attached to ring closure 106 and, thereby attached to the toy (e.g., ball 100) by way of ring closure 106. Advantageously, the optional cover can refurbish and extend the service life of the toy.

Figure 2:
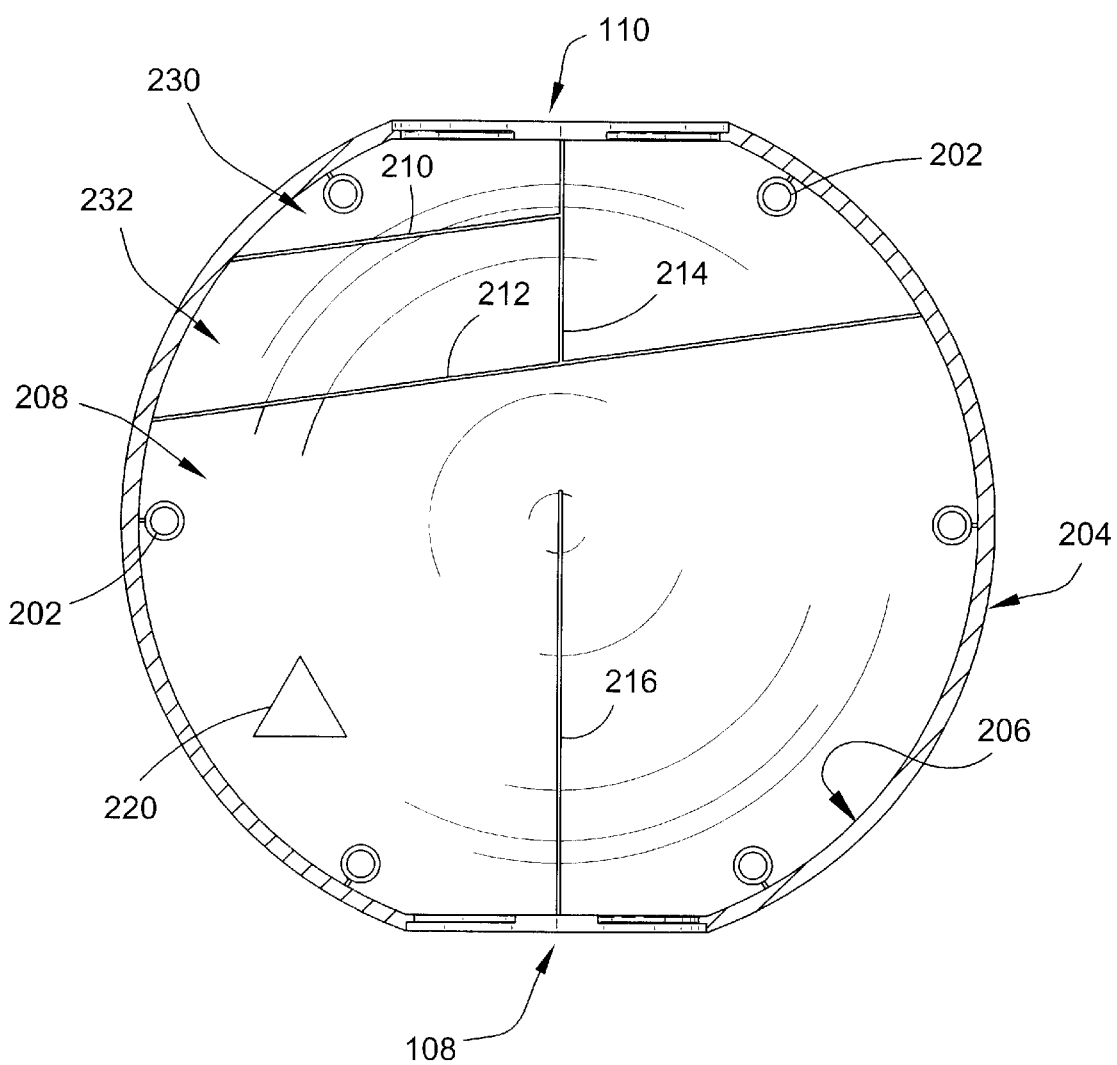
FIG. 2 is a cross sectional view of a first half sphere, illustrating barrier members suitable for use as part of the treat dispensing toy of FIG. 1.
Figure 3:
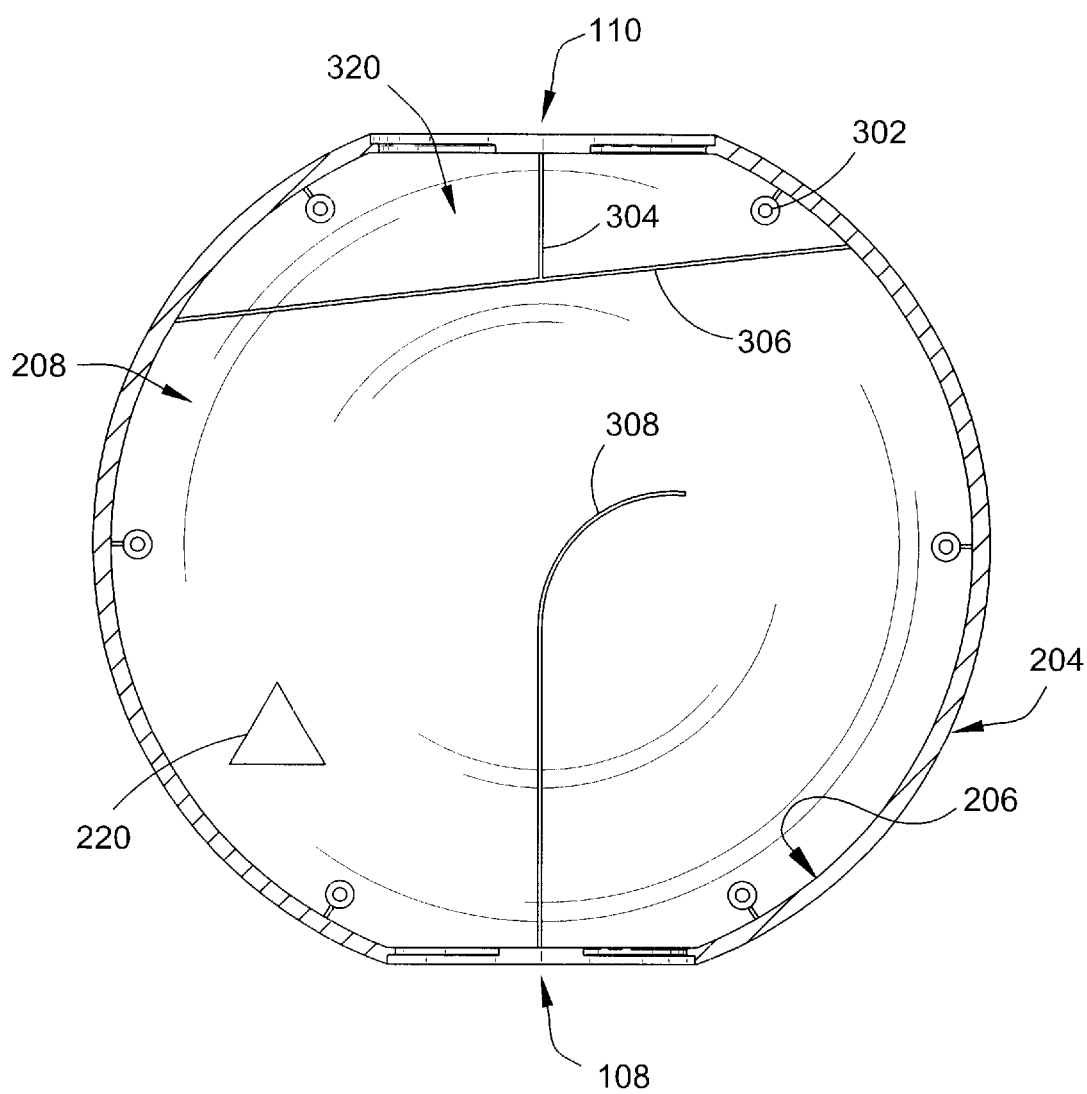
FIG. 3 is a cross sectional view of a second half sphere, illustrating barrier members suitable for use as part of the treat dispensing toy of FIG. 1.

FIGS. 2 and 3 are cross-sectional views of two half spheres 200 and 300 that may be mated together along a substantially circular edge of each to form housing 102. The first half sphere 200 includes a plurality of sockets 202 positioned about its circular edge for mating with a plurality of corresponding pins 302 positioned about the circular edge of the second half sphere 300. When mated together, the exterior of half spheres 200 and 300 form the exterior surface 204 and inner surface 206 of housing 102, and define an interior space 208. Other manufacturing and mating schemes are possible.

The lower portion of the interior space 208, as shown in FIGS. 2 and 3, is generally referred to as a treat cavity. One or more treats 220, such as a pet treat, may be loaded into the treat cavity of interior space 208. In particular, the treat 220 is loaded into the treat cavity of interior space 208 by removing sound unit 104 (FIG. 1). It should also be noted that FIGS. 2 and 3 are shown with sound unit 104 and ring closure member 106 removed.

A first plurality of barrier members or treat regulators 210, 212, 214, 216 is preferably positioned adjacent the inner surface 206 of half sphere 200. Similarly, a second plurality of barrier members or treat regulators 304, 306, 308 is positioned adjacent the inner surface 206 of half sphere 300. Although a detailed explanation of the functionality of these barrier members is provided below, it should now be appreciated that the various barrier members cooperate to retard the movement of treat 220 as ball 100 is manipulated by a user. By retarding the movement of treat 220, ball 100 regulates treat dispensing.

Figure 4A:
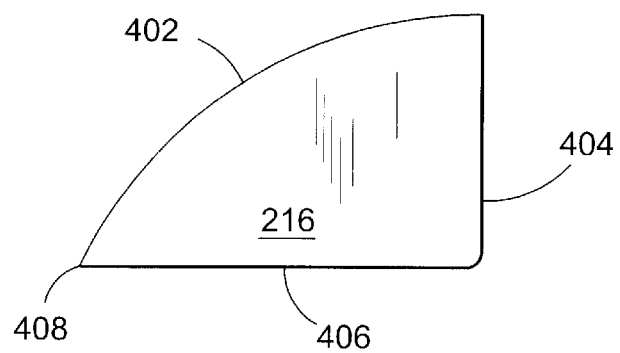
FIGS. 4A–4G are top views of the barrier members of FIGS. 2 and 3.

FIGS. 4A–4G illustrate detailed aspects of the barrier members (sometimes referred to as fin members). FIG. 4A is a plane view of barrier member 216. Barrier member 216 has a generally arcuate edge 402 that is affixed to inner surface 206 of half sphere 200, and two substantially straight edges 404, 406 that are not so affixed. The arcuate edge 402 is positioned along the inner surface 206 such that a tip 408 substantially abuts the opening 108, as shown in FIG. 2.

Figure 4B:
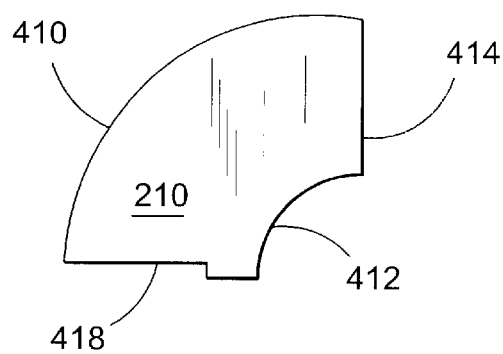

FIG. 4B is a view of barrier member 210. The view depicted in FIG. 4B is looking at barrier 210 from exit 110. Barrier member 210 has a first generally arcuate edge 410 that is affixed to inner surface 206 of half sphere 200 along a contour having substantially the same shape as the edge 410 (e.g., semi-circular). A second generally arcuate edge 412 of barrier member 210 is not affixed and forms part of a semi-circular hole, the center of which is preferably substantially centered about the central axis 112 (FIG. 1). A substantially straight edge 414 is affixed to barrier member 214 at a position identified in FIG. 4C by a line 416 (shown in phantom). Thus, the length of edge 414 is substantially the same as the length of the line 416. Barrier member 210 also has a tabbed edge 418 that is exposed to interior space 208.

Figure 4C:
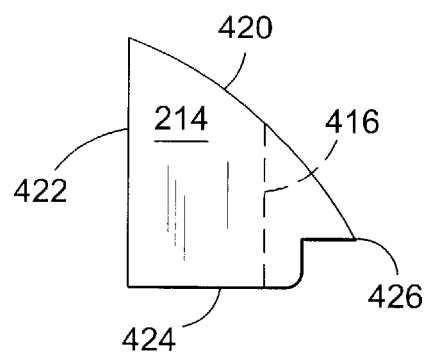

FIG. 4C is a view of barrier member 214. As illustrated therein, barrier member 214 has a generally arcuate edge 420 adjacent a substantially straight edge 422. Barrier member 214 also has a notched edge 424. The arcuate edge 420 of barrier member 214 is affixed to inner surface 206 of half sphere 200 such that a tip 426 abuts exit 110, and such that the edge 422 substantially bisects barrier member 212 at a position identified in FIG. 4D by a line 430 (shown in phantom). Thus, the length of edge 422 is substantially the same as the length of the line 430. The notched edge 424 is exposed to interior space 208.

Figure 4D:
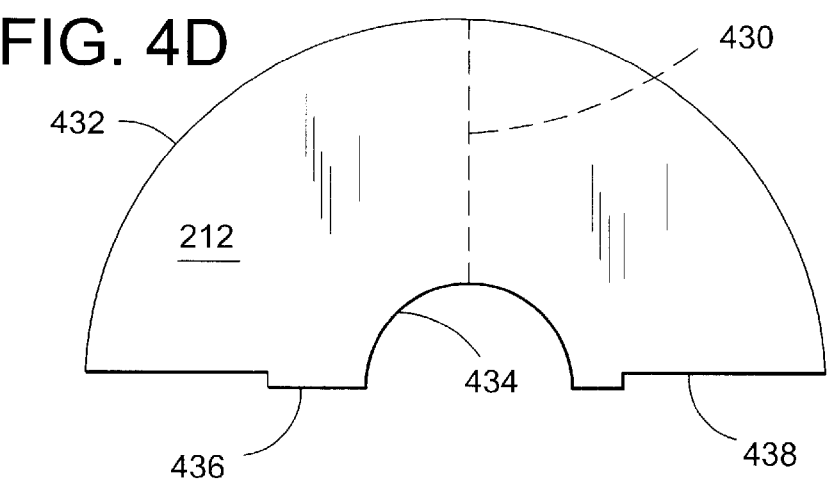

FIG. 4D is a view of barrier member 212. The view depicted in FIG. 4D is looking at barrier 212 as viewed from exit 110. Barrier member 212 has a first generally arcuate edge 432 that is affixed to inner surface 206 of half sphere 200 along a contour having substantially the same shape as the edge 432. A second generally arcuate edge 434 of barrier member 212 is not affixed and forms part of a semi-circular hole, the center of which is preferably substantially centered about central axis 112. First and second tabbed edges 436, 438 are exposed to interior space 208.

Figure 4E:
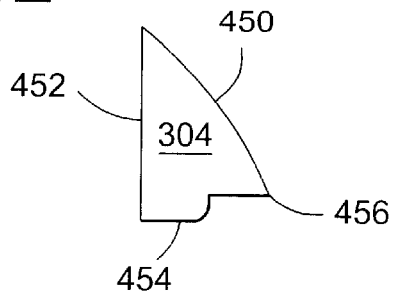

FIG. 4E is a view of barrier member 304. As shown therein, barrier member 304 has a generally arcuate edge 450, a substantially straight edge 452, and a notched edge 454. The arcuate edge 450 of barrier member 304 is affixed to inner surface 206 of half sphere 300 along a contour having substantially the same shape as the edge 450. A tip 456 of barrier member 304 abuts exit 110 at a position substantially opposite of the tip 426 of barrier member 214 (FIG. 4C). The straight edge 452 substantially bisects barrier member 306 at a position identified in FIG. 4G by line 458 (shown in phantom). The length of edge 452 is substantially the same as the length of the line 458. The notched edge 454 of barrier member 304 is exposed to interior space 208.

Figure 4F:
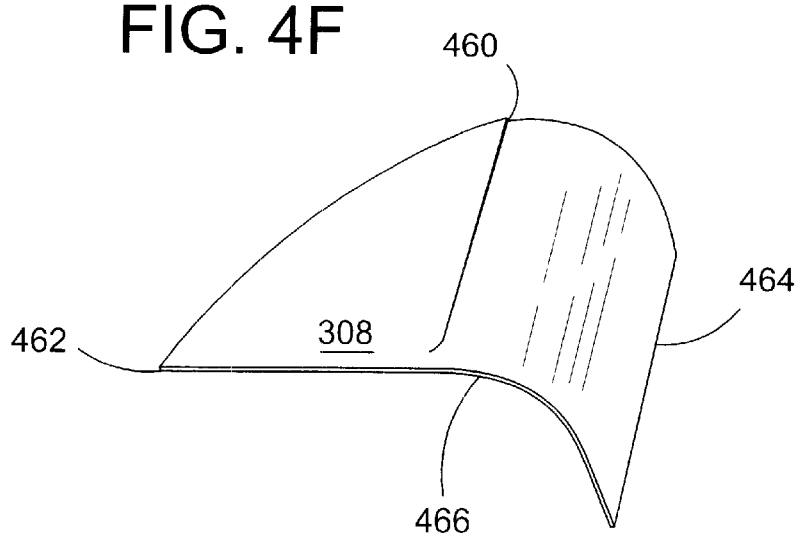

FIG. 4F is a perspective view of barrier member 308. Barrier member 308 has a generally J-shaped curved edge 460 that is affixed to inner surface 206 of half sphere 300 along a contour having substantially the same shape as the edge 460. A tip 462 of barrier member 308 abuts opening 108 at a position substantially opposite of the tip 408 of barrier member 216 (FIG. 4A). Barrier member 308 also has a straight edge 464 and a curved edge 466 that are exposed to interior space 208.

Figure 4G:
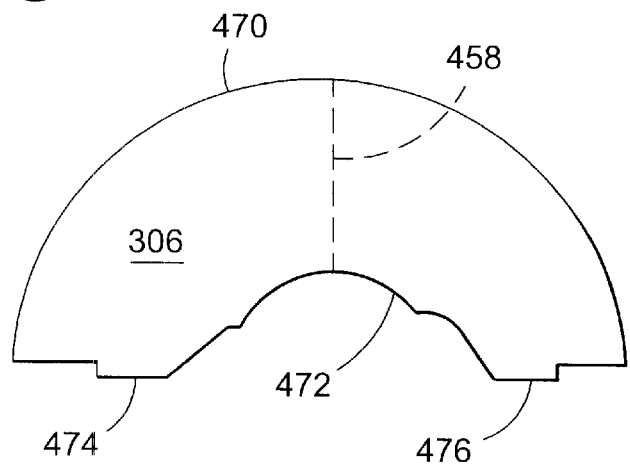

FIG. 4G is a view of barrier member 306. The view depicted in FIG. 4G is looking at barrier 306 from exit 110. Barrier member 306 has a generally arcuate edge 470, a notched arcuate edge 472, a first tabbed edge 474, and a second tabbed edge 476. The arcuate edge 470 is affixed to inner surface 206 of half sphere 300 along a contour having substantially the same shape as edge 470. The notched arcuate edge 472 and the first and second tabbed edges 474, 476 are exposed to interior space 208.

Figure 5:
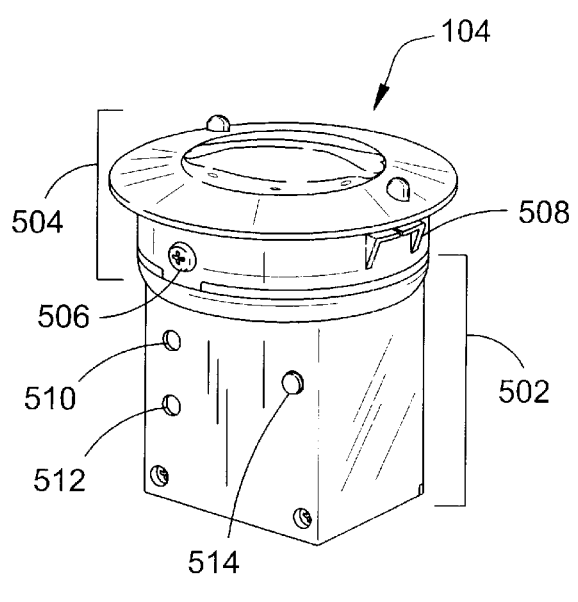
FIGS. 5 and 6 are perspective views of a sound unit suitable for use with the treat dispensing toy of FIG. 1.
Figure 6:
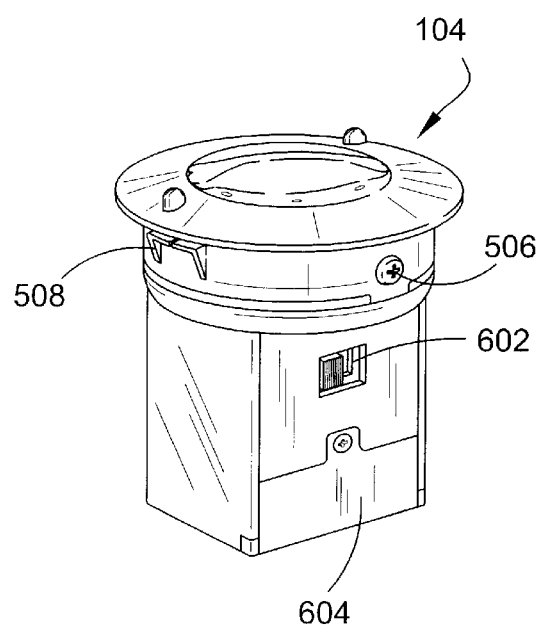

FIGS. 5 and 6 are perspective views of sound unit 104. As illustrated therein, sound unit 104 includes a main body 502 and an end cap 504 that is removably affixed to main body 502 by fasteners such as screws 506. The end cap 504 includes a pair of bayonet tabs 508 for securing sound unit 104 to opening 108 by means that are known in the art. End cap 504 also covers a speaker (not shown in FIGS. 5 and 6). FIG. 5 illustrates that sound unit 104 preferably includes a microphone 510, an LED 512, and a record switch 514. FIG. 6 illustrates an on/off switch 602, and a battery cover 604. The operation of these aspects of sound unit 104 will be explained in greater detail below with respect to FIG. 8.

Figure 7:
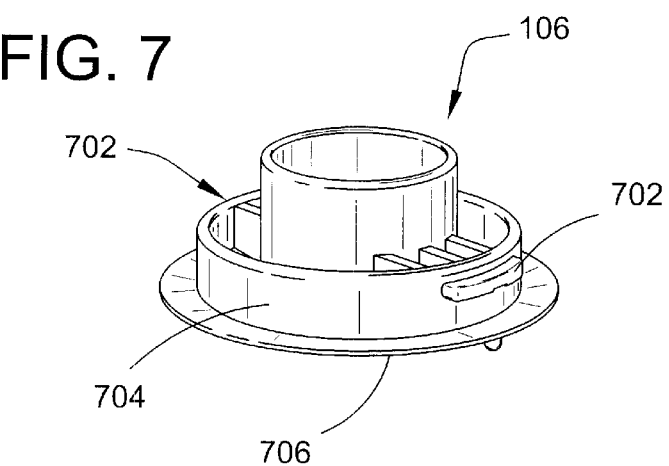
FIG. 7 is a perspective view of a ring closure member suitable for use with the treat dispensing toy of FIG. 1.

FIG. 7 is a perspective view of ring closure member 106. As can be appreciated from FIG. 7, ring closure member 106 preferably includes a pair of bayonet tabs 702, a disk member 704, and a flange 706. The bayonet tabs 702 are positioned on opposite sides of the disk member 704. Bayonet tabs 702 secure ring closure 106 to exit 110 by means that are understood in the art. Preferably, when ring closure 106 is properly secured to exit 110, the flange member 706 is substantially flush with the outer surface 204 of shell 102.

Figure 8:
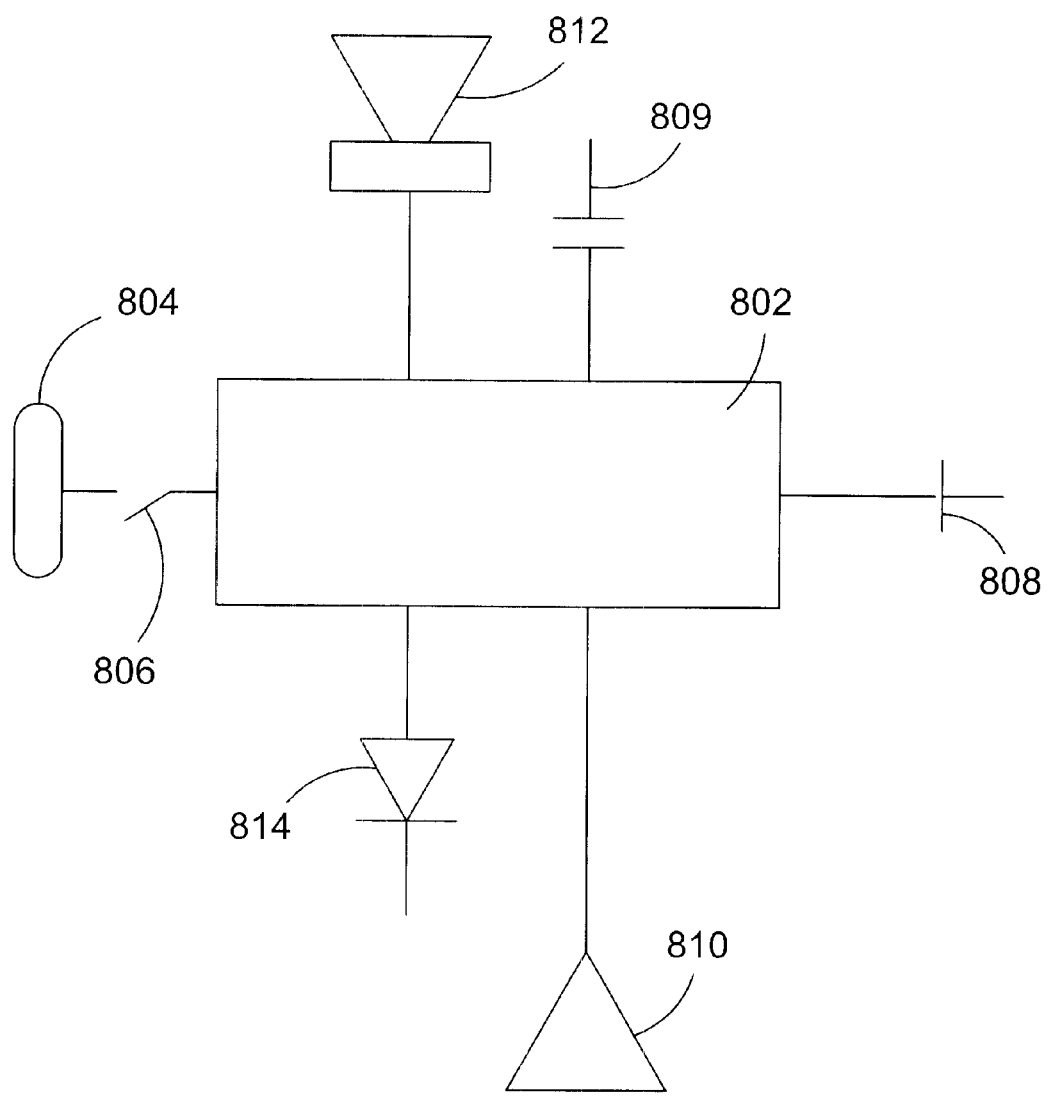
FIG. 8 is a block diagram of the electronics associated with the sound unit depicted in FIGS. 5A and 5B.

FIG. 8 is a schematic of a circuit suitable for implementing an electronics package associated with sound unit 104. The electronics package includes a miniature processing device (e.g., processor 802). The type of processing device used is not critical, however it is preferred that the device be capable of storing one second or more of recorded sound data in a non-volatile memory. Processor 802 is preferably powered by one or more batteries 804, such as miniature 1.5 volt watch or calculator batteries. A power switch 806 (see also on/off switch 602 in FIG. 6) allows processor 802 to become operational. Also connected as an input to processor 802 is a record switch 808. Preferably, the record switch 808 comprises a momentary contact switch that is normally in the open position. A microphone 810 (see also reference character 510 in FIG. 5) is also connected as an input to processor 802. A motion-activated playback initiation switch 809 is another input to processor 802. A speaker 812 is connected as an output to processor 802, as is an LED 810 (see also reference character 512 in FIG. 5).

Figure 9A:
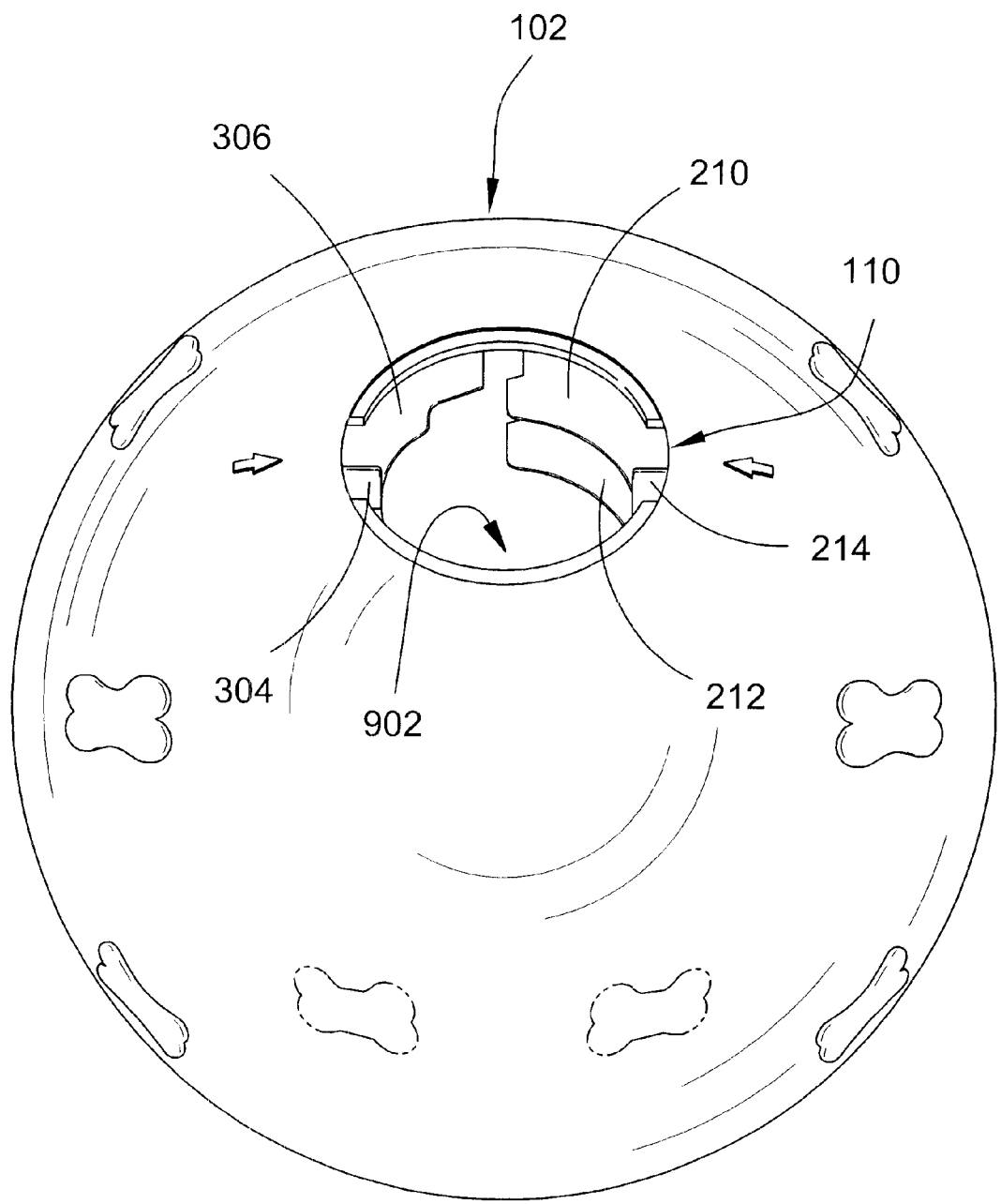
FIG. 9A is a perspective view of one embodiment of the treat dispensing toy of FIG. 1, providing a perspective view of several of the barrier members illustrated in FIGS. 2, 3, and 4A–G.

FIG. 9A is a perspective view of ball 100 of FIG. 1 that illustrates how barriers 210, 212, 214, 304, and 306 cooperate to retard and otherwise affect the movement of treat 220 when ball 100 is manipulated by a user such as a dog or other pet attempting to cause treat 220 exit ball 100. For clarity, FIG. 9A is drawn with ring closure 106 removed. One of the reasons for making ring closure 106 removable is to facilitate cleaning of the interior of ball 100. It is to be understood, however, that ring closure member is preferably secured to exit 110 during normal use.

Figure 9B:
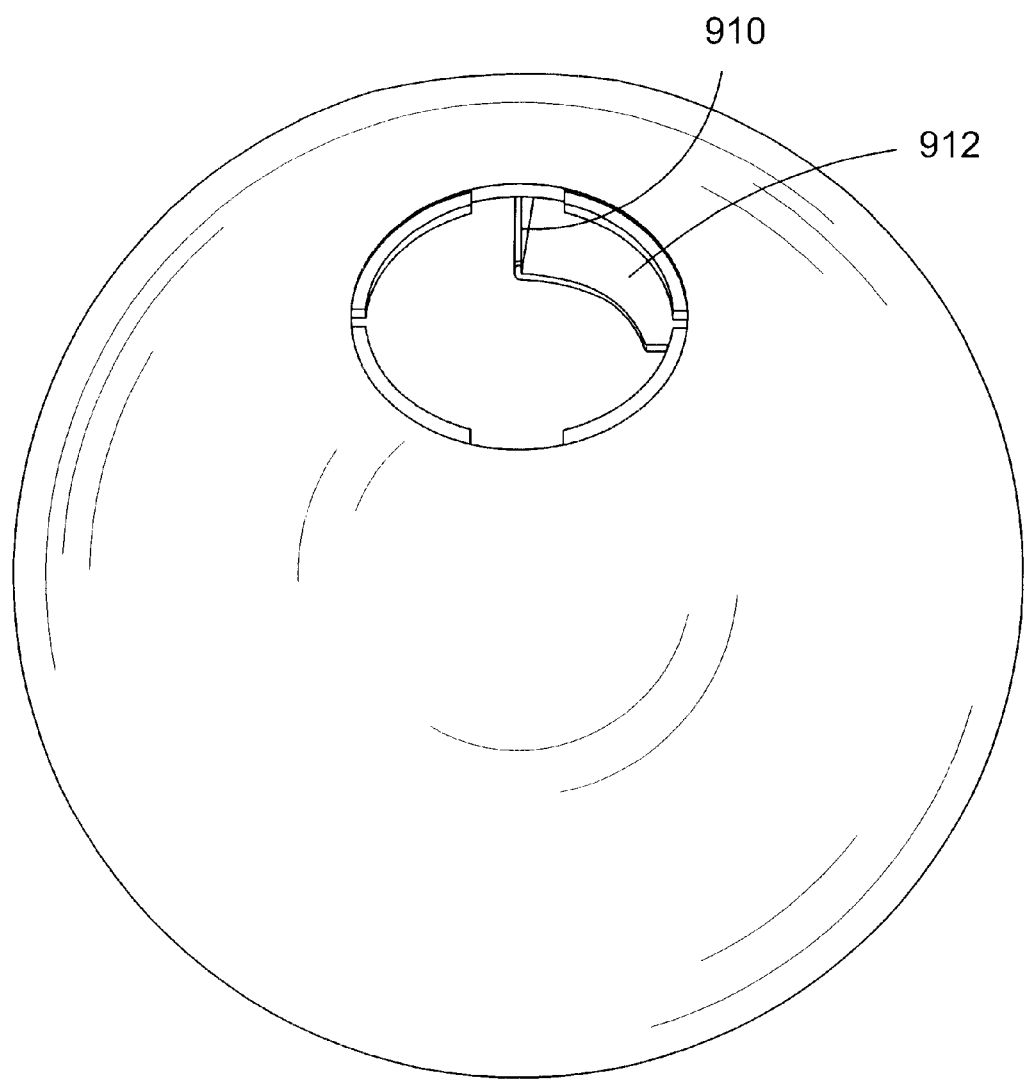
FIG. 9B is a perspective view of an alternative embodiment of the treat dispensing toy of FIG. 1 having a reduced number of barrier members.

As shown in FIG. 9A, barriers 210, 212, and 306 operate to form a staircase or ladder-like arrangement between a first portion of shell 102 and another portion of shell 102. Arcuate edge 412 of barrier 210, arcuate edge 434 of barrier 212, and arcuate edge 472 of barrier 306 form a bore 902 between exit 110 and the first portion of shell 102. It should be understood, however, that fewer or more barrier members may also be employed. FIG. 9B illustrates an alternative embodiment of ball 100 having a generally vertical barrier member 910 and a generally horizontal barrier member 912 (generally perpendicular to the barrier member 910) that cooperate to form a trap. FIG. 9B is illustrated without a ring closure installed. Such an embodiment may be used in connection with relatively smaller toys.

Figure 10:
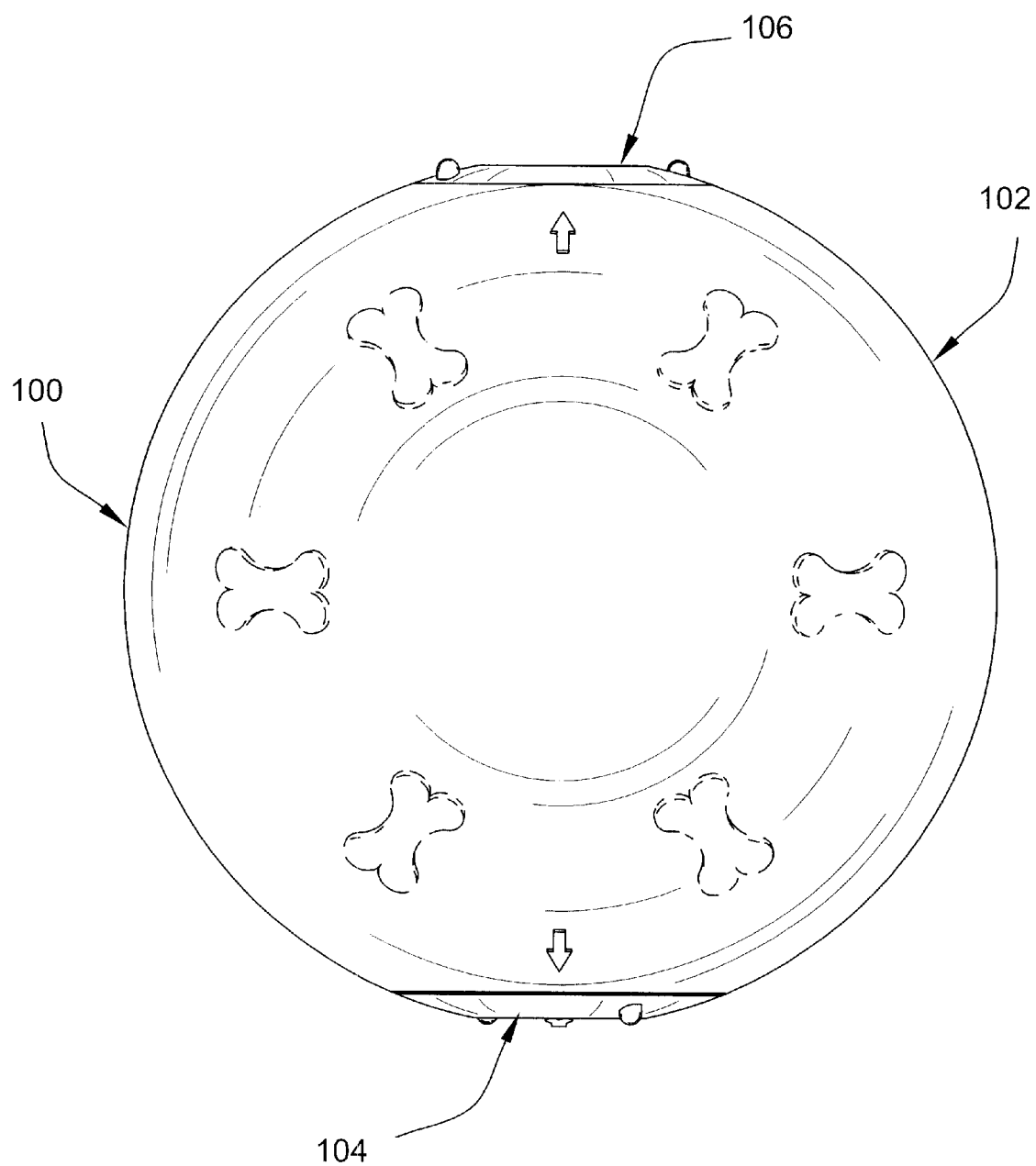
FIG. 10 is a side view of the treat dispensing toy of FIG. 1 with the sound unit and ring closure installed.

FIG. 10 is a side view of ball 100 of FIG. 1 with sound unit 104 and ring closure 106 secured to housing 102.

The operation of ball 100 will now be described. Referring first to FIGS. 1, 5, 6, and 8, when sound unit 104 is removed from housing 102, messages may be recorded by and stored in processor 802. For example, when power switch 806 is in the on position, power is supplied to processor 802. If a person thereafter depresses record switch 808 and utters a message into microphone 810, the message is recorded and stored processor 802. It should be understood that the term message is not to be construed to literally limit that which may be recorded to simple spoken messages. Rather, any recordable sound may be recorded and stored. The user may, for example, want to record a particular message known to stimulate his or her pet (e.g., "hey boy!!"). This feature advantageously allows the toy to entertain the user with a familiar voice or sound when the user and the person who made the recording are separated. When a message is being recorded, LED 814 preferably illuminates to indicate the status of the unit. It is also to be understood that multiple messages may be recorded that may be played back in a random and/or predefined order.

When power is supplied to processor 802, playback of the recorded message is initiated by action of the motion-activated playback initiation switch 809 ("playback switch"). Depending upon the intended user of toy 100, the type of playback switch 809 may be varied without detracting from the present invention. For example, playback switch 809 may be activated to cause processor 802 to play the recorded message by a simple motion such as rolling toy 100. Playback switch 809 could also be selected to cause message playback activation by a complex motion such as an impact upon the ball exceeding a preset value (e.g., dropping it from a distance). Simpler playback activation is also compatible with the present invention such as having the message played at specific or random time intervals whenever power is supplied to processor 802. Playback of the message serves several useful purposes, including stimulating a user to engage and manipulate ball 100.

Referring again to FIGS. 2 and 3, when sound unit 104 is removed, one or more treats 220 such as edible pet treats may be inserted into interior space 208 of housing 102 via opening 108. When sound unit 104 is thereafter secured to housing 102, opening 108 is closed, preventing treat 220 from exiting ball 100 by way of opening 108. When ball 100 is being used, ring closure 106 is preferably secured to exit 110 so that treat 220 can only exit ball 100 by passing through ring closure 106.

It should now be appreciated that the combination of sound unit 104 and the plurality of barriers 210, 212, 214, 216, 304, 306, 308 cooperate to retard the egress of treat 220 from ball 100 as ball 100 is manipulated by a user, such as a dog. For example, the interaction of barrier 304 and 306 of half shell 300 form a pair of traps 320, 321 that limit the possible course of travel of treat 220. Similarly, barriers 210, 212, and 214 cooperate to form additional traps 230, 232, 234 that also limit the possible course of travel of treat 220 as ball 100 is manipulated by a user. In the preferred embodiment depicted in the figures, the barrier members prevent treat 220 from navigating directly along inner surface 206 toward exit 110 as ball 100 is rolled. By this action, treat release is regulated, and barrier members 210, 212, 214, 304, and 306 cooperate to form a staircase-like mechanism by which treat 220 cannot easily depart (egress) ball 100 via exit 110. Likewise, barriers 216 and 308, along with sound unit 104, cooperate to tend to force treats to engage the other barriers (e.g., 212 and 306) as ball 100 is manipulated.

Figure 11:
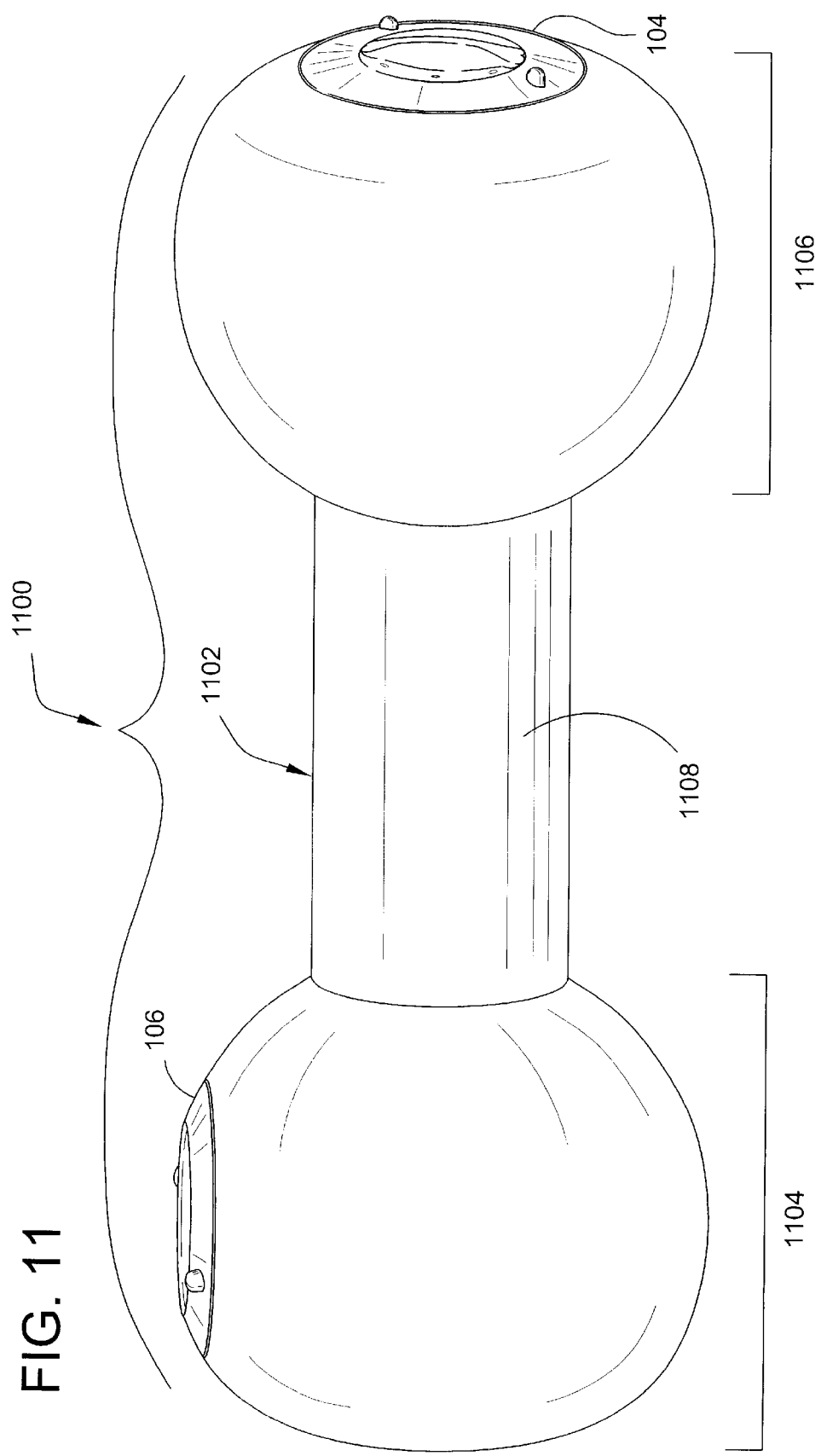
FIG. 11 is a side view of another embodiment of a treat dispensing toy, having a sound recording and playback capability, in accordance with aspects of the present invention.

FIGS. 11–16 illustrate other embodiments of a treat dispensing toy, preferably having a sound recording and playback capability, in accordance with aspects of the invention. Referring first to FIG. 11, illustrated therein is a side view of a generally bone-shaped treat dispensing toy 1100. As depicted in FIG. 11, the treat dispensing toy 1100 includes a housing 1102 and is preferably constructed and arranged to use substantially the same removable parts as used in ball 100 (FIG. 1). In other words, toy 1100 preferably uses sound unit 104 and ring closure 106. In one embodiment, toy 1100 is constructed out of a hard or substantially rigid substance, such as plastic, using standard manufacturing processes. Generally speaking, the particular embodiment of toy 1100 may be described as comprising two bulbous components 1104, 1106 (also referred to as generally spherical components) joined by an elongated shaft 1108. Like ball 100, toy 1100 may be optionally covered with a protective cover that generally conforms to the shape of toy 1100. Also like ball 100, toy 1100 may be optionally covered with raised features or embossments (not illustrated in FIG. 11) about the exterior of housing 1102.

Figure 12:
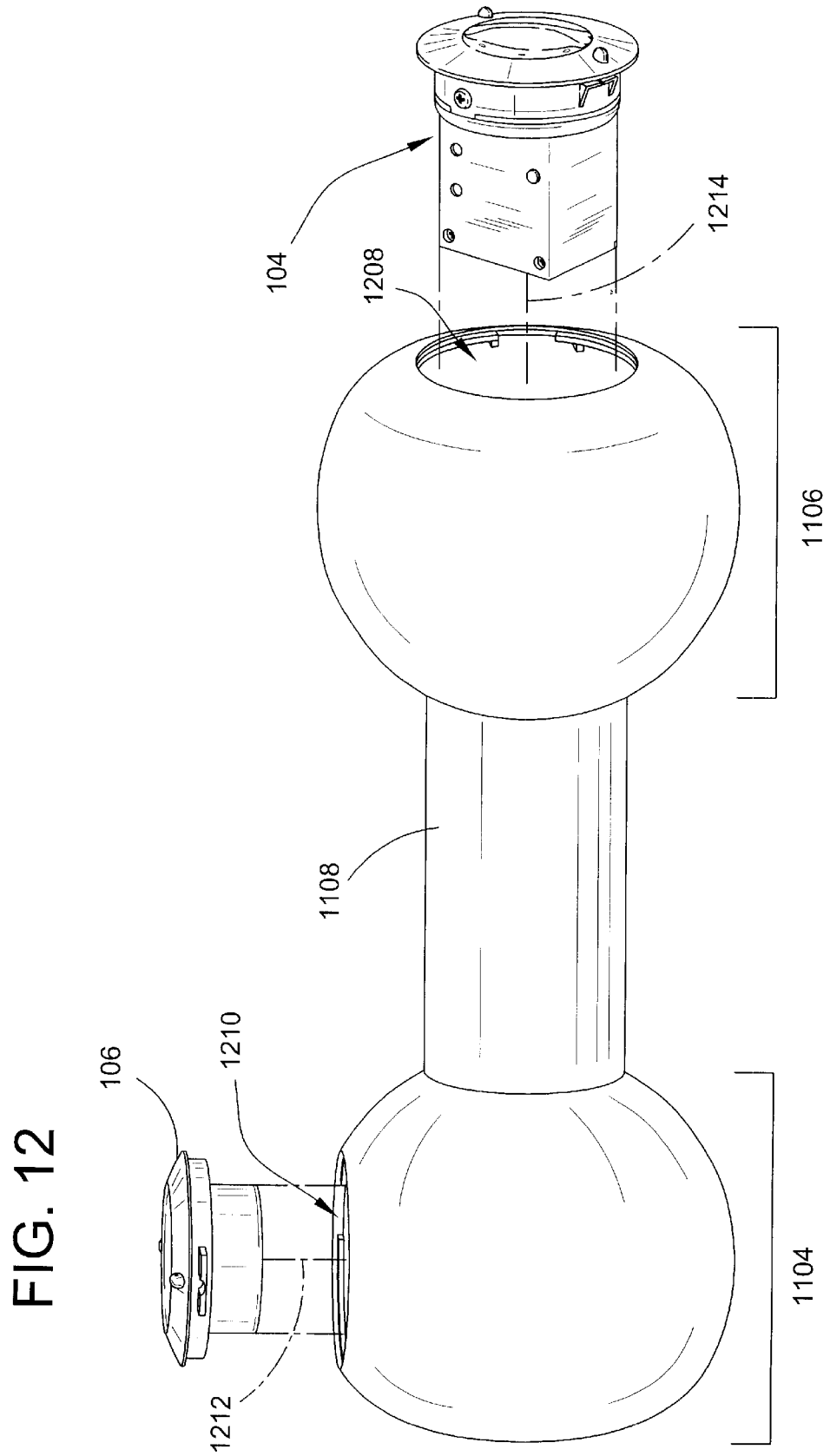
FIG. 12 is a separated side view of the treat dispensing toy of FIG. 11.

FIG. 12 is a separated side view of the treat dispensing toy of FIG. 11. As illustrated therein, when used in connection with toy 1100, sound unit 104 is removably secured to an opening 1208. Similarly, ring closure 106 is removably secured to an exit 1210. The exit 1210 is preferably positioned substantially about a first axis 1212 extending substantially perpendicular to the shaft 1108 of toy 1100. The opening 1208 is preferably positioned substantially about a second axis 1214 substantially parallel to shaft 1108 of toy 1100.

Figure 13A:
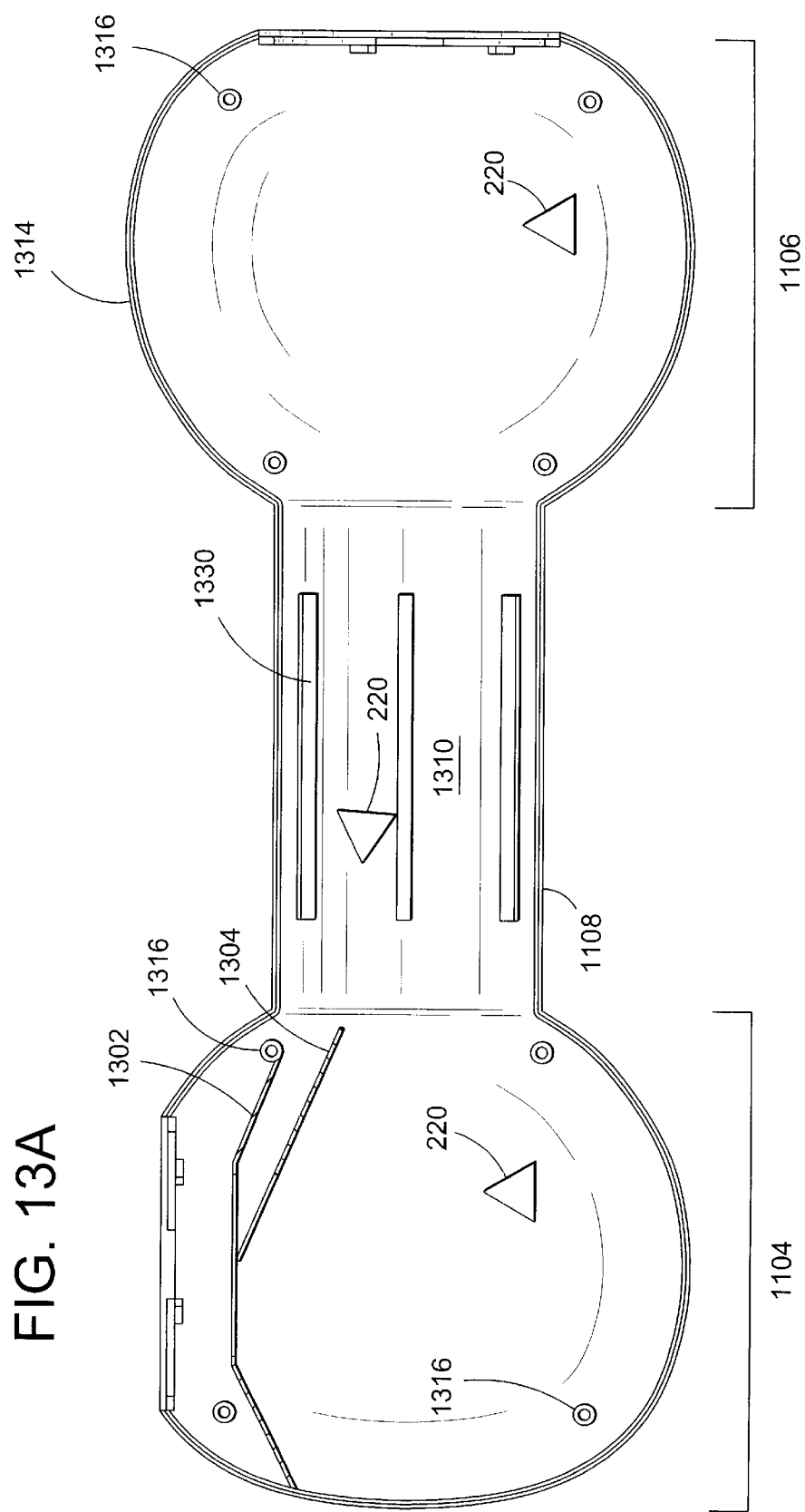
FIGS. 13A and 13B are cross sectional views, illustrating barrier members suitable for use as part of the treat dispensing toy of FIG. 11.
Figure 13B:
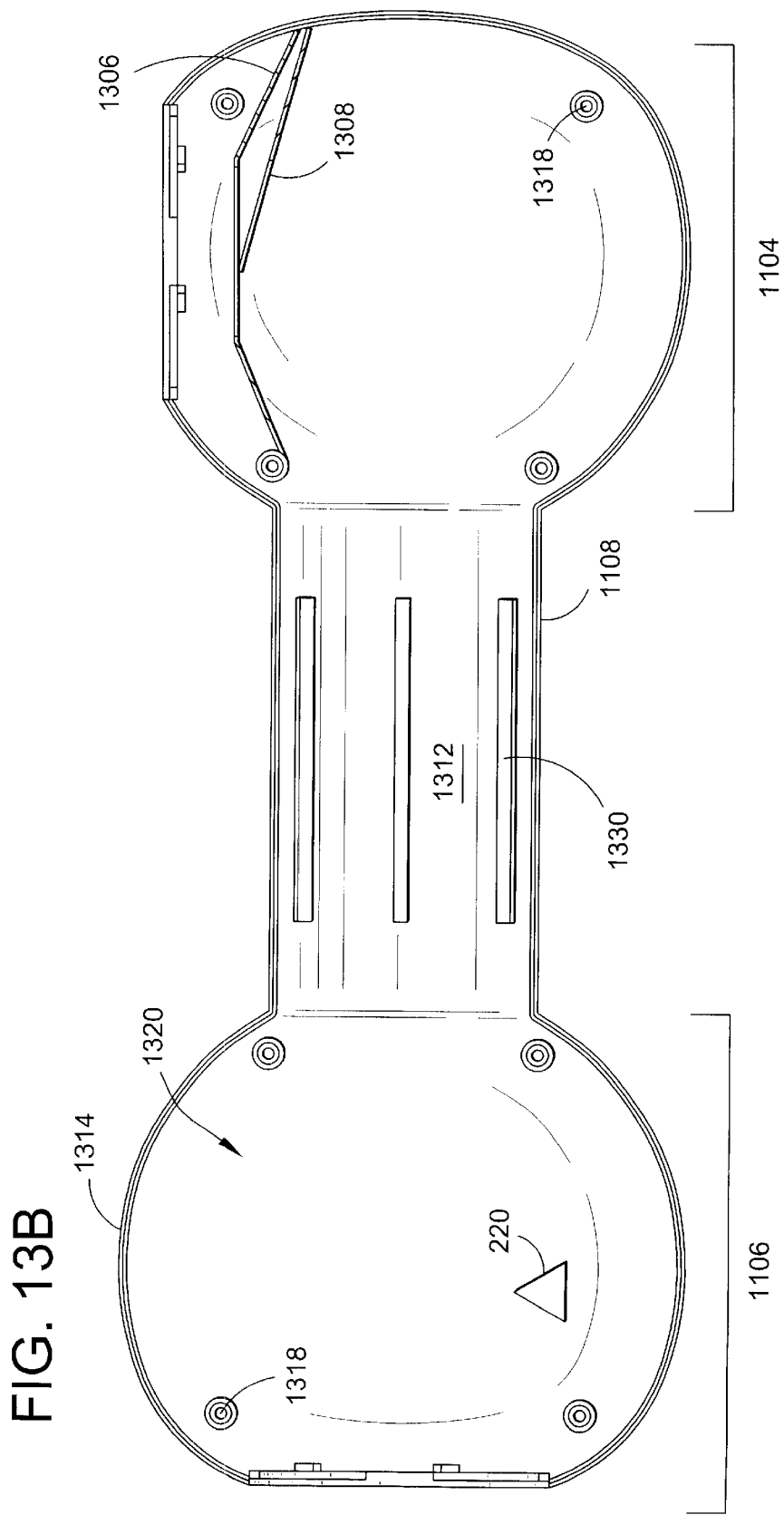

FIGS. 13A and 13B are cross sectional views of toy 1100, illustrating a plurality of barrier members 1302, 1304, 1306, and 1308. In particular, FIGS. 13A and 13B illustrate two half shells 1310 and 1312 that are preferably joined together along a generally bone-shaped edge 1314 to form the housing 1102. It should be noted that FIGS. 13A and 13B are illustrated with sound unit 104 and ring closure 106 removed. In one embodiment, the first half shell 1310 includes a plurality of pins 1316 positioned about its edge for mating with a plurality of sockets 1318 positioned about the edge of the second half shell 1312. Other manufacturing techniques are possible. When joined together, half shells 1310, 1312 form an interior space 1320. The portion of the interior space associated with bulbous component 1106 corresponds to a treat cavity. One or more treats 220 are preferably loaded into the treat cavity by removing sound unit 104.

A first plurality of barrier members 1302, 1304 is preferably positioned adjacent the inner surface of half shell 1310. Likewise, a second plurality of barrier members 1306, 1308 is positioned adjacent the inner surface of half shell 1312. The first and second plurality of barrier members cooperate to retard the movement of treats 220 as toy 1100 is manipulated by a user. By retarding the movement of treats 220, toy 1100 regulates treat dispensing.

In one embodiment, each half shell 1310, 1312 also includes a plurality of stiffeners 1330 positioned on the interior surface of each half shell along shaft 1108. Each stiffener 1330 preferably runs for a majority of the length of shaft 1108. Stiffeners 1330 may be constructed out of plastic or other suitable material. Advantageously, the plurality of stiffeners 1330 may be constructed to channel and partially retard the movement of treats 220 as such treats move along shaft 1108 when toy 1100 is being manipulated by a user.

Figure 14B:
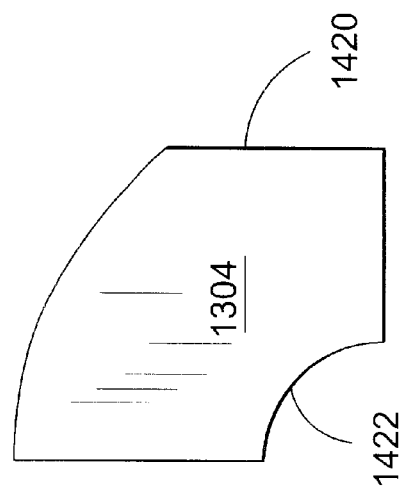
FIGS. 14A and 14B are representative top views of barrier members suitable for use in connection with the treat dispensing toy of FIG. 11.
Figure 14A:
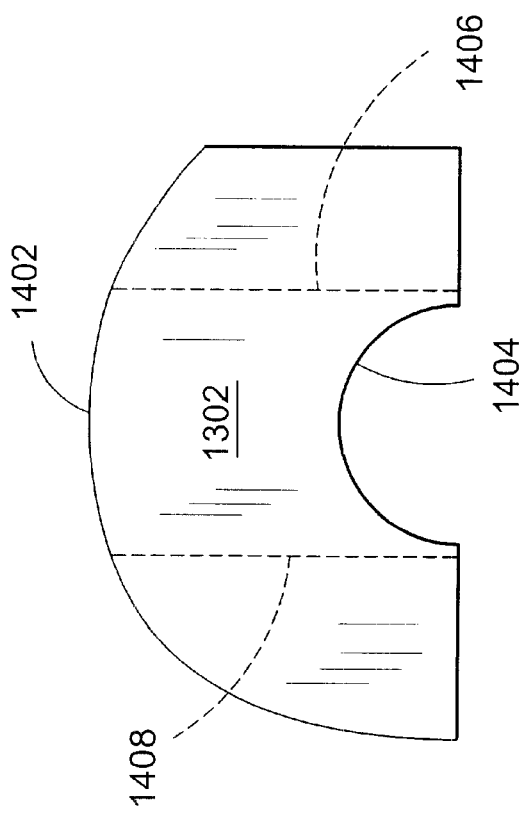

FIGS. 14A and 14B are top views of barrier members suitable for use in connection with toy 1100. In particular, FIG. 14A illustrates a top view of barrier member 1302 (FIG. 13A). As illustrated, barrier member 1302 has a first generally arcuate edge 1402 that is preferably affixed to the inner surface of half shell 1310. It should be understood that the barrier members can be constructed integrally with the toy (integrally affixed) or can be constructed separately and thereafter affixed to the half shell. A second generally arcuate edge 1404 is not affixed and forms part of a hole, the center of which is preferably positioned substantially about axis 1212 (FIG. 12). As illustrated in FIGS. 13A and 14A, in one embodiment barrier member 1302 bends along lines 1406 and 1408. Half shell 1312 preferably includes a barrier member (e.g., barrier member 1306) that is substantially symmetrical to barrier member 1302 such that when half shells 1310, 1312 are mated, barrier members 1302 and 1306 form a hole about axis 1212.

FIG. 14B illustrates a top view of barrier member 1304. In the embodiment illustrated, barrier member 1304 comprises a partial disk having a first arcuate edge 1420 that is preferably affixed to the inner surface of half shell 1310. A second arcuate edge 1422 is not affixed and forms part of an opening about axis 1212. Half shell 1312 preferably includes a barrier member (e.g., barrier member 1308) that is generally similar and symmetrical to barrier member 1304. The barrier members 1304, 1308 can be positioned to form traps that further retard the movement of treats 220 as toy 1100 is manipulated by a user.

Figure 15:
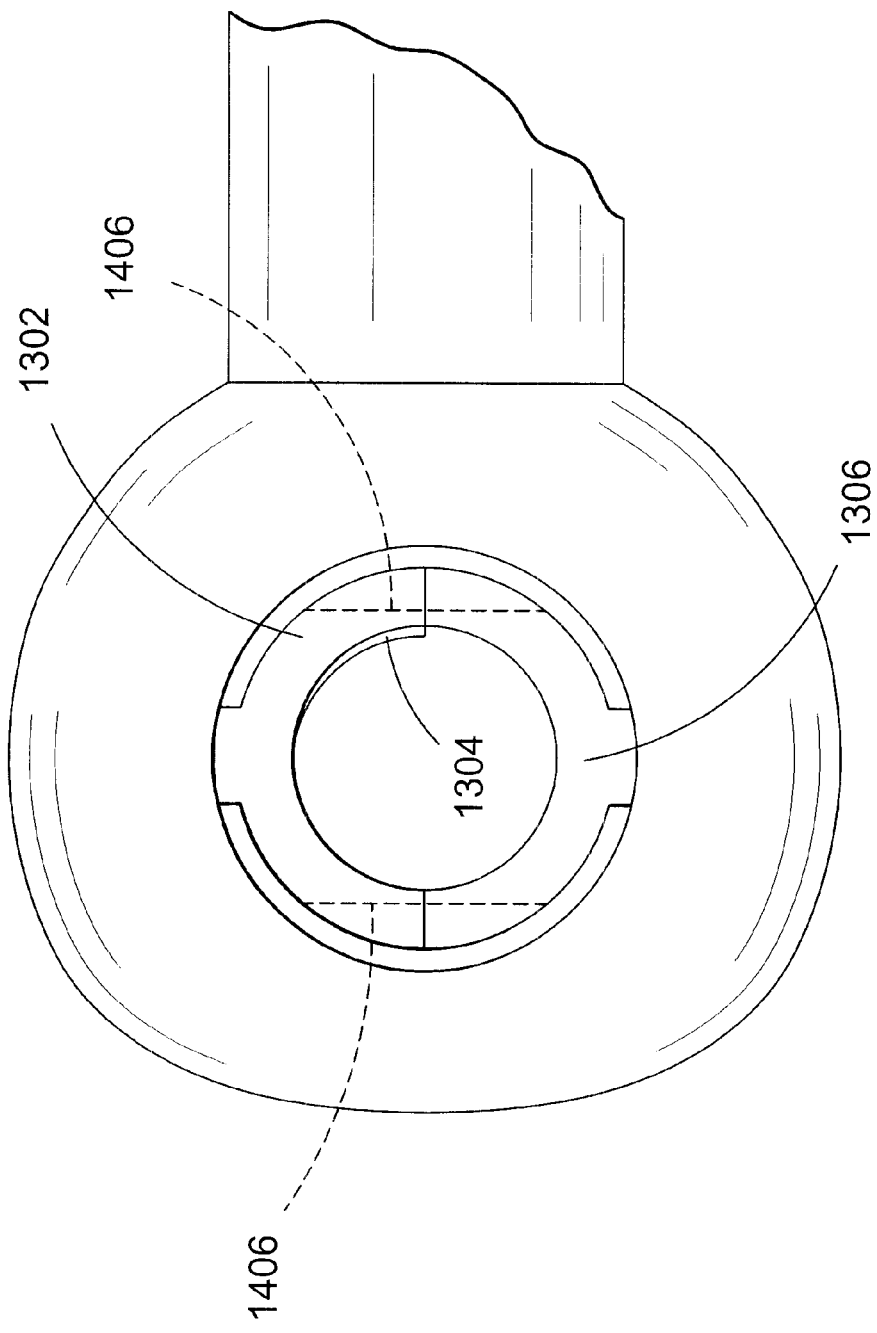
FIG. 15 is a perspective view of the treat dispensing toy of FIG. 11, providing a perspective view of some of the barrier members illustrated in FIGS. 13A, 13B, 14A, and 14B.

FIG. 15 is a perspective view of toy 1100 of FIG. 11 (with ring closure 106 removed) that illustrates how, in one embodiment, the various barrier members cooperate to retard the egress of treats 220. It should now be appreciated, therefore, that toy 1100 is preferably constructed and arranged such that treats 220 cannot navigate directly along the inner surface of toy 110 toward the exit as toy 110 is manipulated. By this action, treat release is regulated, in part, by one or more of the barrier members.

The operation of toy 1100 is substantially similar to that of ball 100. In general, sound unit 104 is preferably removed to load treats 220 into the interior of bulbous component 1106 (a treat cavity). With sound unit 104 turned on and securely replaced, as the user manipulates toy 1100, treats 220 move about the interior until they fall out of exit 1210. As toy 1100 is manipulated, sound unit 104 preferably plays a noise such as a recorded message, thereby encouraging the user to further manipulate toy 1100.

Figure 16:
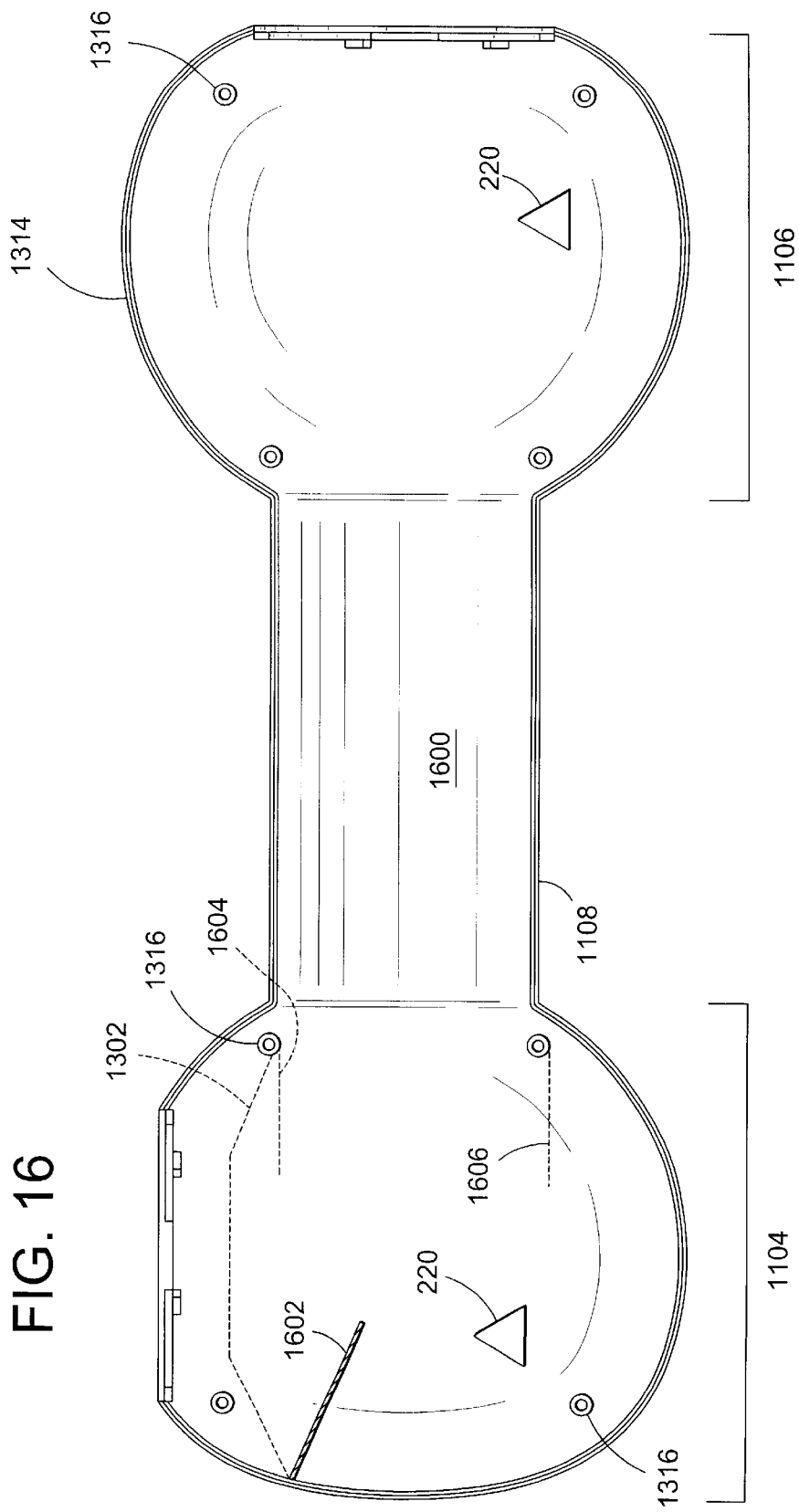
FIG. 16 is a cross sectional view illustrating one alternative arrangement of barrier members suitable for use in connection with the treat dispensing toy of FIG. 11.

FIG. 16 is a cross sectional view illustrating alternative arrangements of barrier members suitable for use in connection with the treat dispensing toy of FIG. 11. FIG. 16 is illustrated with sound unit 104 and ring closure 106 removed. In one arrangement, a single semi-circular barrier member 1602 is affixed to the interior of the toy. The barrier member 1602 preferably comprises a partial disk that is similar to, for example, barrier 306 (FIG. 4G) or barrier 1304 (FIG. 14B). FIG. 16 also illustrates that additional barrier members such as barrier 1302 (see FIG. 13A), 1604, and 1606 may also be used in combination with barrier 1602. Preferably, each half shell includes corresponding barrier members that cooperate to retard the movement of treats 220.

Figure 17A:
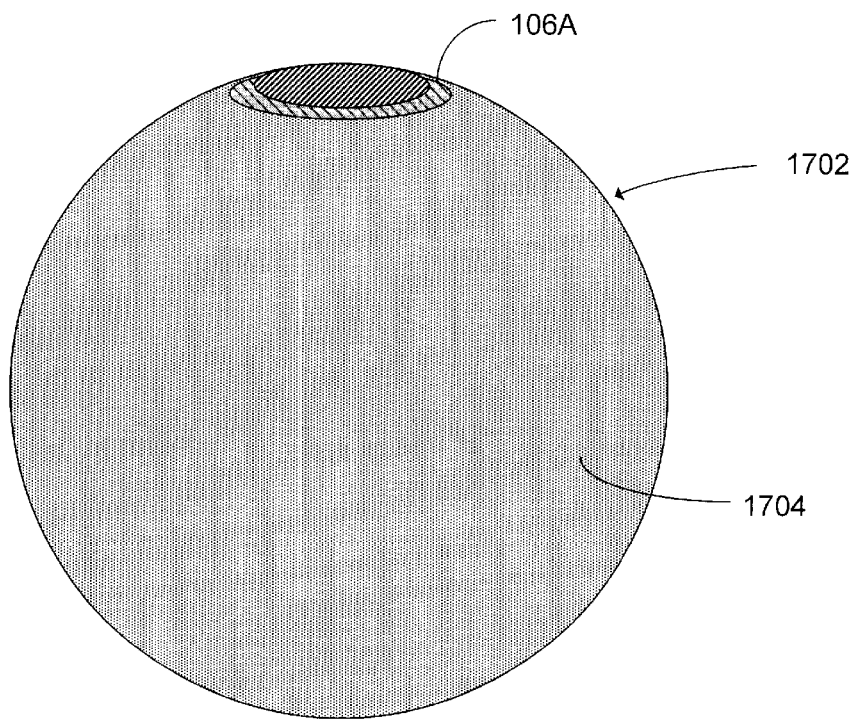
FIGS. 17A and 17B are side views of one embodiment of a cover suitable for use in connection with the treat dispensing toy of FIG. 1.
Figure 17B:
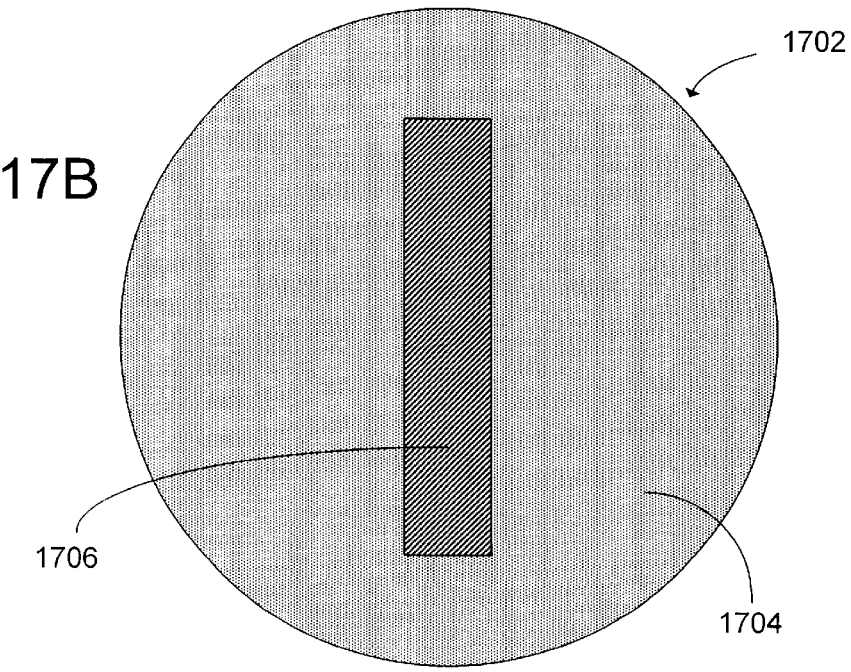

FIGS. 17A and 17B illustrate two side views of one embodiment of a cover 1702 suitable for use in covering the treat dispensing toy 100 of FIG. 1. In the illustrated embodiment, the cover 1702 is preferably constructed using a generally flexible sheathing 1704 including an exit hole. The flexible sheathing 1704 is preferably sized and shaped for covering substantially all of the toy housing. The cover is secured attached to a ring closure 106A. Preferably, the ring closure 106A is substantially the same as ring closure 106, except that it is secured to cover 1702. As such, the hole of the cover aligns with the hole in ring closure 106A.

The sheathing 1704 may be any suitable material such as a plush material, neoprene, burlap, rubber, other materials or combinations thereof. The cover 1702 also includes an access aperture 1706 that is sized and shaped to allow the housing to be placed inside the cover. Thus, the access aperture 1706 is preferably made using a material or materials that provide for opening and exposing the interior of cover 1702, as well as for closing the access aperture and the cover. For example, access aperture 1706 may comprise a lengthwise slit and be constructed with a hook and loop fastener closure (e.g., VELCRO), a zipper, buttons, shoe strings, snaps, and so on. In the illustrated embodiment, access aperture 1706 is preferably positioned opposite ring closure 106A. With such a positioning, access aperture corresponds to the position of sound unit 104.

Although cover 1702 is illustrated in FIGS. 17A and 17B as a generally spherical cover, other sizes and shapes are contemplated. For example, cover 1702 may be constructed and arranged in a particularly attractive form such as an animal shape (e.g., a bear), a geometric shape (e.g., a heart or star), or another shape. By way of further example, in one embodiment, sheathing 1704 has an interior surface that is sized and shaped to accept the toy housing (e.g., housing 102) and an exterior surface that is sized and shaped to depict the attractive form.

The operation of the embodiment illustrated in FIGS. 17A and 17B is now described. In use, ring closure 106 of toy 100 is removed and housing 102 is placed inside of cover 1702 (inside sheathing 1704) via access aperture 1706. The housing 102 of toy 100 is oriented such that exit 110 substantially aligns with ring closure 106A. Ring closure 106A is inserted and locked into exit 110 to secure cover 1702 to toy 100. Thereafter, access aperture 1706 is closed. Advantageously, therefore, toy 100 has been reconfigured yet treat dispensing remains possible if that capability is desired.

It should be appreciated that other covers may be used in accordance with aspects of the invention. For example, another embodiment does not replace ring closure 106 with ring closure 106A. Rather, a cover is constructed and arranged such that it is held in place by the original ring closure 106 (e.g., ring closure 106 cinches the cover into place and maintains the cover's general orientation relative to the housing). In this form, the cover preferably includes an exit hole to be aligned with exit 110 and ring closure 106. In another form, the cover can be constructed to fit tightly over the toy such that it is held in place by friction. For example, a neoprene or rubber cover could be used that fits tightly to the toy. In such an embodiment, the cover preferably includes an exit hole to be aligned with exit 110 and ring closure 106. It should be further appreciated that covers can be constructed to fit toys of various shapes and dimensions, such as bone-shaped toys. Moreover, covers need not necessarily conform to the shape of the underlying toy. Also, the toy can be placed inside the cover at the time the toy is manufactured, and the cover need not allow for easy removal of the toy from inside of the cover.

Although the preferred embodiments have been described primarily with respect to a toy for use in dispensing a pet treat when used by a pet, the toy of the present invention may also be used as a children's toy for dispensing treats or other desired objects.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A toy suitable for dispensing treats when the toy is manipulated by a user, said toy comprising:
   a housing having an interior space and an exterior surface, said interior space defining a treat cavity for storing a treat to be dispensed from the toy, said housing being constructed from a substantially rigid material;
   an exit from the housing through which the treat is dispensed when the toy is manipulated by the user;

a sound unit secured to the housing, said sound unit sounding a noise when the toy is manipulated by the user; and a cover for covering the housing, said cover being constructed from a generally flexible material allowing the housing to be placed inside the cover, whereby when the housing is placed inside the cover, the cover covers substantially all of the exterior surface of the housing.

2. A toy as set forth in claim 1 further comprising a treat regulator positioned within the interior space for impeding movement of the treat when the toy is manipulated by the user.

3. A toy as set forth in claim 1 further comprising an opening in the housing and wherein the sound unit is constructed and arranged to be removably secured to the opening such that the treat may be loaded into the treat cavity via the opening when the sound unit is removed.

4. A toy as set forth in claim 1 wherein the sound unit comprises an electronic playback device for selectively playing a prerecorded sound, and wherein the noise sounded when the toy is manipulated by the user comprises the prerecorded sound.

5. A toy as set forth in claim 4 wherein the electronic playback device comprises a recording device for selectively recording a desired message and the prerecorded sound comprises the desired message.

6. A toy as set forth in claim 5 wherein the electronic playback device further comprises a sound activation switch for causing the electronic playback device to play the prerecorded sound when the toy is manipulated by the user.

7. A toy as set forth in claim 1 wherein the housing is generally spherically shaped.

8. A toy as set forth in claim 1 wherein the housing is generally bone shaped.

9. A toy as set forth in claim 1 further comprising a closure member having a hole therethrough, said closure member being constructed and arranged to be removably attached to the exit from the housing, and wherein the cover includes an exit hole such that when the housing is placed inside the cover and oriented so that the exit hole is generally aligned with the exit and the closure member is attached to the exit, the cover is affixed to the housing at the exit by the closure member.

10. A toy as set forth in claim 9 wherein the closure member is attached to the cover such that the hole in the closure member is substantially aligned with the exit hole in the cover.

11. A toy as set forth in claim 1 wherein the cover further comprises an access aperture for allowing the housing to be placed inside the cover and an aperture closure for selectively closing the access aperture.

12. A toy as set forth in claim 11 wherein the access aperture comprises a slit in the cover and the aperture closure comprises a hook and loop closure.

13. A toy as set forth in claim 1 wherein the generally flexible material is a plush material, a burlap material, a rubber material, or a neoprene material.

14. A toy as set forth in claim 1 wherein the generally flexible material substantially conforms to a shape of the housing.

15. A toy as set forth in claim 14 wherein the cover has an exit hole therethrough and is constructed to fit tightly around the housing such that when the housing is placed inside the cover and oriented so that the exit hole in the cover is generally aligned with the exit, the exit hole and the exit tend to remain generally aligned.

16. A toy as set forth in claim 1 wherein the cover has an interior surface sized and shaped to accept the housing and an exterior surface shaped differently than the interior surface of the cover.

17. A toy as set forth in claim 16 wherein the exterior surface of the cover has an animal shape or a geometric shape.

18. A cover for use in connection with a treat dispensing toy, said toy including a housing and a sound unit secured to the housing, said housing having an interior space for storing a treat, an exterior surface, and a housing exit through which the treat may be dispensed, said cover comprising:

generally flexible sheathing sized and shaped for covering substantially all of the exterior surface of the housing; and an access aperture in the generally flexible sheathing, said access aperture being sized and shaped for allowing the housing of the toy to be placed inside the sheathing, and an aperture closure adjacent the access aperture for selectively closing the access aperture.

19. A cover as set forth in claim 18 further comprising a removable closure secured to the generally flexible sheathing, said closure having a hole therethrough and being constructed and arranged to be removably attached to the housing exit, and wherein the generally flexible sheathing includes an exit hole such that when the housing is placed inside the cover and oriented so that the exit hole is generally aligned with the housing exit and the closure is attached to the housing exit, the cover is affixed to the housing at the housing exit by the closure.

20. A cover as set forth in claim 18 wherein the generally flexible sheathing conforms to a shape of the housing.

21. A cover as set forth in claim 20 wherein the generally flexible sheathing is sized and shaped to fit tightly around the housing.

22. A cover as set forth in claim 20 wherein the access aperture comprises a slit in the generally flexible sheathing and the aperture closure comprises a hook and ring closure.

23. A cover as set forth in claim 18 wherein the generally flexible sheathing is a plush material, a burlap material, a rubber material, or a neoprene material.

24. A cover as set forth in claim 18 wherein the generally flexible sheathing has an interior surface sized and shaped to accept the housing and an exterior surface shaped differently than the interior surface of the generally flexible sheathing.

25. A cover as set forth in claim 24 wherein the exterior of the generally flexible sheathing has an animal shape or a geometric shape.

26. A toy for dispensing treats comprising:

a generally hollow housing having an inner surface defining an interior space, and an exterior surface, said housing being generally bone-shaped and having a first end and a second end opposite said first end;

an opening in the housing at the first end constructed and arranged to facilitate loading a treat into the interior space of the housing;

a treat regulator positioned in the interior space of the housing;

an exit in the housing at the second end constructed and arranged to permit the treat to be dispensed from the housing;

a sound unit for selectively playing a sound, said sound unit being removably secured to the opening to substantially close the opening to prevent said treat from exiting the toy through the opening; and a cover for covering the housing, said cover being constructed from a generally flexible material allowing the housing to be placed inside the cover.

* * * * *